(12) United States Patent
Pedemonte et al.

(10) Patent No.: US 6,368,362 B1
(45) Date of Patent: Apr. 9, 2002

(54) REACTIVE DYE MIXTURES FOR LOW-SALT DYEING

(75) Inventors: Ronald Pedemonte, Eppstein-Vockenhausen; Uwe Reiher, Hofheim; Christina Schumacher, Kelkheim; Martin Kunz, Eppstein; Joachim Eichhorn, Frankfurt am Main, all of (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 09/553,429

(22) Filed: Apr. 19, 2000

(30) Foreign Application Priority Data

Apr. 22, 1999 (DE) .......................................... 199 18 160

(51) Int. Cl.⁷ .............................. D06P 3/66; D06P 1/382; D06P 1/384; C09B 67/24
(52) U.S. Cl. ........................ 8/549; 8/639; 8/918; 8/641
(58) Field of Search ............................ 8/639, 549, 918

(56) References Cited

U.S. PATENT DOCUMENTS

| 3,669,951 A | 6/1972 | Bien et al. | |
|---|---|---|---|
| 5,330,539 A | 7/1994 | Phillips et al. | |
| 5,456,728 A | 10/1995 | Schwarz et al. | ................ 8/549 |
| 6,190,423 B1 | * 2/2001 | Schumacher et al. | |

FOREIGN PATENT DOCUMENTS

| DE | 1644171 | 7/1970 |
|---|---|---|
| DE | 41 42 766 | 2/1993 |
| WO | WO 93/18224 | 9/1993 |
| WO | WO 98/42784 | 10/1998 |
| WO | WO 98/42785 | 10/1998 |

\* cited by examiner

*Primary Examiner*—Margaret Einsmann
(74) *Attorney, Agent, or Firm*—Connolly Bove Lodge & Hutz LLP

(57) ABSTRACT

The present invention relates to mixtures of reactive dyes comprising at least two dyes selected from the group consisting of the general formulae (1), (2) and (3)

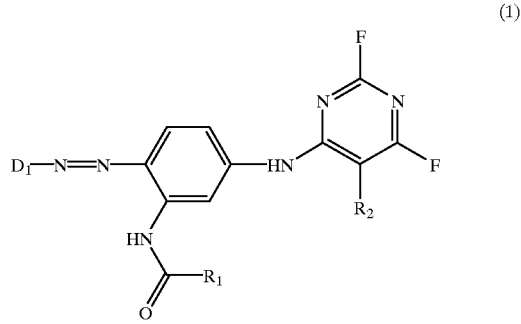

(1)

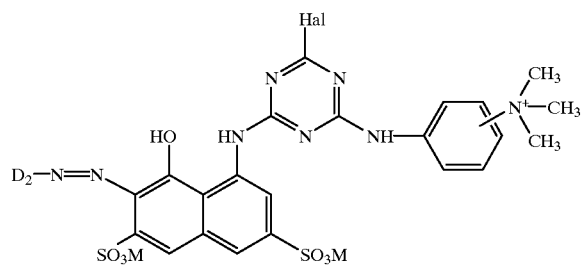

(2)

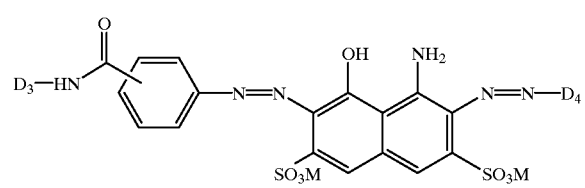

(3)

where $D_1$, $D_2$, $D_3$, $R_1$, $R_2$, Hal and M are each as defined in claim 1, processes for their preparation and their use for dyeing and printing hydroxyl- and/or carboxamido-containing materials.

20 Claims, No Drawings

REACTIVE DYE MIXTURES FOR LOW-SALT DYEING

The present invention relates to the technical field of fiber-reactive dyes.

Reactive dyes useful for dyeing cellulose fibers are well known and extensively described in the literature. However, these conventional dyes generally do not adequately meet the high present day expectations with regard to their suitability for specific dyeing processes, with regard to the dyeability of the fibers and with regard to the fastness properties of the dyed product. A particular disadvantage is that the known dyes, almost without exception, have to be dyed with comparatively large amounts of electrolyte salt, generally 50 to 100 g of electrolyte salt per liter of dyebath.

WO 98/42784, WO 98/42785, WO 93/18224 and U.S. Pat. No. 5,330,539, it is true, describe dyes which can be applied with significantly smaller amounts of salt. However, using no electrolyte salts at all frequently provides only weak dyeings.

There is thus a need for reactive dyes which can be applied with very little or even no salt and which provide strong dyeings under these conditions.

It has now been surprisingly found that mixtures of dyes of the hereinbelow indicated general formulae (1), (2) and (3) meet the stipulated requirements. Dyes (1) and (2) are already known per se and described in the literature. For instance, dyes of the general formula (1) may be found in DE-A 1 644 171 and dyes of the general formula (2) in WO98/42785.

The present invention provides mixtures of reactive dyes comprising at least two dyes selected from the group consisting of the general formulae (1), (2) and (3)

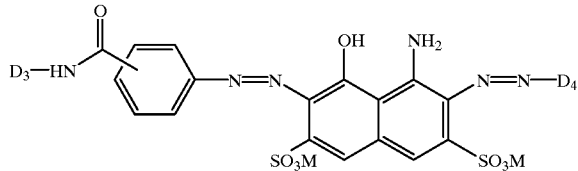

(1)

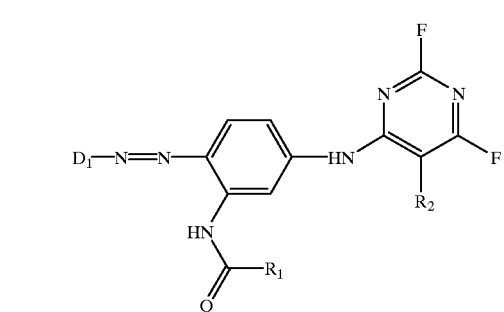

(2)

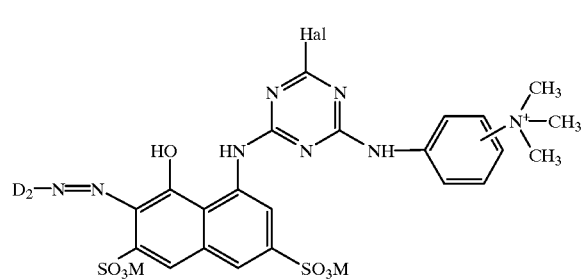

(3)

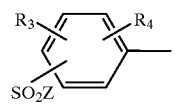

where
D$_1$ is a benzene or naphthalene ring containing one or more sulfonic acid groups;
R$_1$ is methyl or amino;
R$_2$ is hydrogen or chlorine;
Hal is fluorine or chlorine;
M is hydrogen or an alkali metal;
D$_2$ to D$_4$ are each a group of the general formula (D)

(D)

where
R$_3$ and R$_4$ are independently hydrogen, methyl, ethyl, methoxy, ethoxy, sulfo or carboxyl, and
Z is —CH=CH$_2$ or —CH$_2$CH$_2$Z$_1$, where Z$_1$ is an alkali-detachable group.

Two-dye mixtures according to the invention may contain one or more, for example two or three, of each of the dyes of general formulae (1) and (2), (1) and (3) or (2) and (3). The dye or dyes of the general formulae mentioned are each preferably present in amounts of 10 to 90% by weight, particularly preferably 30 to 70% by weight, based on the total amount of dye.

However, preferred dye mixtures according to the invention contain one or more, for example two or three, of each of the dyes of the general formulae (1), (2) and (3). Such mixtures contain in particular dyes of the general formula (1) in amounts of 5 to 90% by weight, dyes of the general formula (2) in amounts of 5 to 80% by weight and dyes of the general formula (3) in amounts of 5 to 90% by weight, in each case based on the total amount of dye.

Particularly preferred dye mixtures according to the invention of dyes of the general formulae (1), (2) and (3) are those which contain dyes of the general formula (1) in amounts of 5 to 50% by weight, dyes of the general formula (2) in amounts of 5 to 50% by weight and dyes of the general formula (3) in amounts of 45 to 90% by weight, and also those which contain dyes of the general formula (1) in amounts of 30 to 80% by weight, dyes of the general formula (2) in amounts of 5 to 50% by weight and dyes of the general formula (3) in amounts of 10 to 50% by weight, in each case based on the total amount of dye.

A benzene or naphthalene ring D$_1$ preferably contains 1, 2 or 3 sulfonic acid groups, particularly preferably 2 sulfonic acid groups.

An alkali metal M can be in particular sodium, potassium or lithium.

In the group of the formula (D) $R_3$ and $R_4$ are each preferably hydrogen.

A group $Z_1$ which is detachable by the action of alkali to leave a vinyl group is in particular chlorine, bromine, thiosulfato, sulfato, phosphate, methylsulfonyloxy, methylsulfonylamido, benzoyloxy, toluylsulfonyloxy or $(C_2–C_5)$-alkanoyloxy, for example acetyloxy. $Z_1$ is preferably sulfato. Z is preferably vinyl or β-sulfatoethyl.

The dyes of the general formulae (2) and (3), especially if the chromophore is the same, may possess different fiber-reactive groups —$SO_2$—Z within the meaning of Z. More particularly, the dye mixtures may include dyes of the same chromophore conforming to the aforementioned general formulae where the fiber-reactive groups —$SO_2$—Z are on the one hand vinylsulfonyl groups and on the other —$CH_2CH_2Z_1$ groups, preferably β-sulfatoethylsulfonyl groups. When the dye mixtures contain some of the respective dye components in the form of a dye having a vinylsulfonyl group, then the fraction of the particular dye which has the vinylsulfonyl group is up to about 30 mol %, based on the respective dye chromophore.

Dye mixtures according to the invention are preparable according to methods known per se and known to one skilled in the art, for example by mechanically mixing the individual dyes in the desired weight fractions, were then in the form of their dye powders or pellets or of aqueous solutions of the individual dyes, including for example the solutions generated in the synthesis of the dyes.

Dye mixtures according to the invention may be present as preparation in solid or in liquid (dissolved) form. In solid form they contain insofar as necessary the electrolyte salts customary in the case of water-soluble and especially fiber-reactive dyes, such as sodium chloride, potassium chloride and sodium sulfate.

Dye mixtures according to the invention are surprisingly dyeable at low depths of shade without any salt, at medium depths of shade with very little salt, such as 1 to 5 g of electrolyte salt/l of dyebath, and at higher depths of shade with a small amount of salt, such as 5 to 10 g of electrolyte salt/l of dyebath, and strong dyeings are obtained in all cases. The abovementioned preparations accordingly generally contain no or less electrolyte salt than preparations of known fiber-reactive dyes. This means that dye mixtures according to the invention provide for an appreciable reduction of the loading of dyehouse wastewater and hence also of the costs for reducing this loading.

Low depths of shade in this context are depths of shade involving the use of not more than 2% by weight of dye, based on the substrate. Medium depths of shade are depths of shade involving the use of 2 to 4% by weight of dye and higher depths of shade are those involving the use of 4 to 10% by weight of dye, in each case based on the substrate.

Solid preparations of dye mixtures according to the invention may further include assistants customary in commercial dyes, such as buffer substances capable of setting a pH in aqueous solution between 3 and 7, such as sodium acetate, sodium borate, sodium bicarbonate, sodium dihydrogenphosphate, sodium citrate and disodium hydrogenphosphate, small amounts of siccatives or, if they are present in liquid, aqueous solution (including the presence of thickeners of the type customary in print pastes) substances which ensure a long life for these preparations, for example mold preventatives.

Generally, dye mixtures according to the invention are present as dye powders containing 30 to 90% by weight, based on the dye powder or the preparation, of dye. These dye powders may additionally include the aforementioned buffer substances in a total amount of up to 5% by weight, based on the dye powder. If dye mixtures according to the invention are present in aqueous solution, then the total dye content in these aqueous solutions is up to about 50% by weight, for example between 5 and 50% by weight. The aqueous solutions (liquid preparations) may include the aforementioned buffer substances in an amount which is generally up to 10% by weight, preferably up to 2% by weight.

The separation from their synthesis solution of the chemically prepared dye mixtures of the invention can be effected according to generally known methods, for example either by precipitating from the reaction medium by means of electrolytes, for example sodium chloride or potassium chloride, or by evaporating or spray-drying the reaction solution, in which case a buffer substance may be added to this reaction solution.

However, dye mixtures according to the invention may also be made up from the individual dyes in the dyeing vessel immediately before the dyeing process, i.e., the individual dyes are applied in the dyebath as a trichromat.

The dyes of the general formulae (1) and (2) may be prepared especially according to the methods indicated in the above-cited references. The dyes of the general formula (3) may be prepared for example by diazotizing an amine of the general formula $D_4$—$NH_2$, where $D_4$ is as defined above, in a conventional manner, for example at −5 to +15° C. in a strongly acidic aqueous medium below a pH of 1.5 and then reacting the resulting diazonium compound in an aqueous medium with 1-amino-8-hydroxy-3,6-disulfonic acid (H-acid) at a pH of 0 to 2 and a temperature of 0 to 10° C. to form the monoazo dye of the general formula (5)

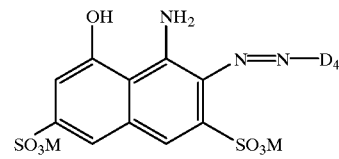

(5)

where $D_4$ and M are each as defined above, and thereafter diazotizing an amine of the general formula (6)

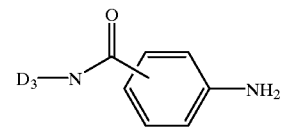

(6)

where $D_3$ is as defined above, in a conventional manner and then coupling the resulting diazonium compound with the monoazo dye of the general formula (5) at a pH of 4 to 7.5, preferably at 5 to 6, and a temperature of 5 to 20° C., preferably between 10 and 15° C., to form the disazo dye of the general formula (3).

Dye mixtures according to the invention are used for dyeing or printing hydroxyl- and/or carboxamido-containing materials, for example in the form of sheetlike structures, such as paper and leather or of films, for example composed of polyamide, or in bulk, as for example polyamide and polyurethane, but especially for dyeing or printing these materials in fiber form. Similarly, the solutions generated in the synthesis of the azo compounds after mixing them to form dye mixtures according to the invention may be used directly as liquid preparation for dyeing, if appropriate after or with addition of a buffer substance, if desired too after concentrating or diluting.

The present invention thus also relates to the use of the dye mixtures of the invention for dyeing or printing such materials in a conventional manner by using a dye mixture of the invention as colorant. Materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

Dye mixtures according to the invention may be applied to and fixed on the substrates mentioned, especially on the fiber materials mentioned, according to the application techniques known for water-soluble dyes, especially according to the application techniques known for fiber-reactive dyes.

For instance, on cellulose fibers they produce from the exhaust method from a long liquor using various acid-binding agents dyeings having very good color yields which are improved compared with the individual dyes. Application is preferably from an aqueous bath at temperatures between 40 and 105° C., optionally at a temperature of up to 120° C. under pressure, and optionally in the presence of customary dyeing assistants. One possible procedure is to introduce the material into the warm bath and to gradually heat the bath to the desired dyeing temperature and to complete the dyeing process at that temperature.

The padding process likewise provides excellent color yields and very good color build-up on cellulose fibers, the dyes being allowed to become fixed on the material by batching at room temperature or elevated temperature, for example at up to 60° C., by steaming or using dry heat in a conventional manner.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print paste and subsequent fixation either by passing the printed material through a hot alkaline bath or by overpadding with an alkaline padding liquor with subsequent batching of the alkali-overpadded material or subsequent steaming or subsequent treatment with dry heat, produce strong prints having well-defined contours and a clear white ground. The outcome of the prints is not greatly affected by variation in fixing conditions.

When fixing by means of dry heat in accordance with the customary thermofix processes, hot air from 120 to 200° C. is used. In addition to the customary steam at 100 to 103° C., it is also possible to use superheated steam and high-pressure steam at temperatures of up to 160° C.

The acid-binding agents which effect the fixation of the dyes of the dye mixtures of the invention on the cellulose fibers include, for example water-soluble basic salts of the alkali metals and alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, sodium silicate or trisodium phosphate. By treating the mixtures of the invention with the acid-binding agents, with or without heating, these become chemically bonded to the cellulose fiber.

The dye mixtures of the invention are notable for a high yield of fixation when applied to cellulose fiber materials by dyeing or printing. Cellulose dyeings in particular, following the customary aftertreatment by rinsing to remove unfixed portions of dye, exhibit excellent wetfastnesses, in particular since unfixed dye portions are easily washed off on account of their good solubility in cold water.

The dyeings and prints obtainable with the dye mixtures of the invention have bright hues. More particularly, the dyeings and prints on cellulose fiber materials have high color strength, good lighffastness and very good wetfastnesses, such as washing, milling, water, seawater, crossdyeing and also acidic and alkaline perspiration fastnesses, also good fastness to pleating, hotpressing and rubbing.

Particularly worthy of note are the high yields of fixation (which may be above 90%) obtainable with the dye mixtures of the invention on cellulose fiber materials. A further advantage of the abovernentioned mixtures is the ease with which portions unfixed during the dyeing process are washed off, whereby the washing process for the dyed cellulose fiber materials can be accomplished with small amounts of wash liquor and optionally with an energy-saving temperature regime during the washing process.

The examples hereinbelow serve to illustrate the invention. Parts and percentages are by weight unless otherwise stated. Parts by weight relate to parts by volume as the kilogram relates to the liter. The compounds described in the examples by means of a formula are indicated in the form of their free acids. Generally, they are prepared and isolated in the form of their salts, preferably lithium, sodium or potassium salts, and used for dyeing in the form of their salts. Similarly, the starting compounds mentioned in the form of the free acid in the examples which follow, especially table examples, may be used in the synthesis as such or in the form of their salts, preferably alkali metal salts, such as sodium or potassium salts.

EXAMPLE 1

A mixture of 0.66 part of the dye of the formula (1a)

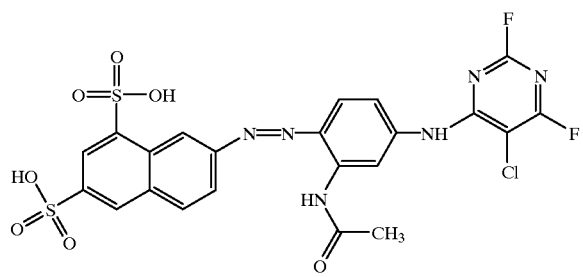

(1a)

0.66 part of the dye of the formula (2a)

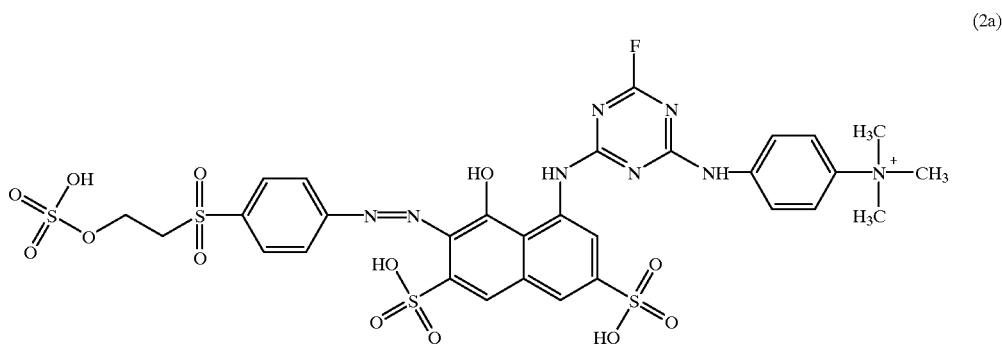

(2a)

0.66 part of dye of the formula (3a)

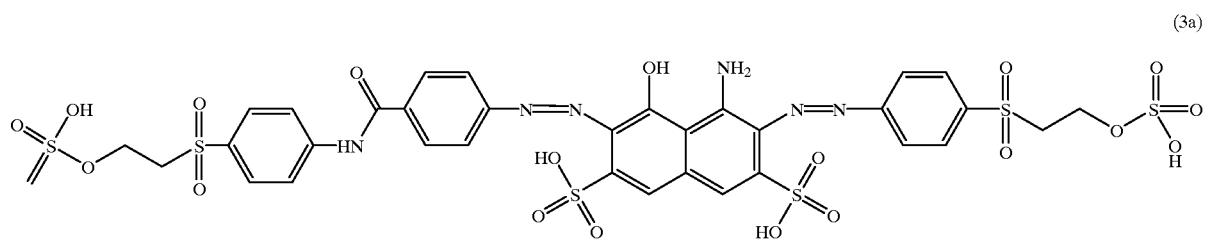

(3a)

8 parts of sodium carbonate and 1 part of a wetting agent is dissolved in 1000 parts of water. This dyebath is entered with 100 g of a cotton fabric. The temperature of the dyebath is heated to 60° C. over 60 minutes and maintained at 60° C. for 30 minutes. Thereafter the dyed material is first rinsed with tapwater for 2 minutes and then with ion-free water for 5 minutes. The dyed material is then introduced at 40° C. into 1000 parts of an aqueous solution containing 1 part of 60% acetic acid. It is subsequently rinsed with ionfree water at 70° C. and soaped off at the boil with a detergent for quarter of an hour, rinsed once more and dried. This gives a strong brown dyeing having very good fastness properties.

EXAMPLE 2

A mixture of 1.33 parts of the dye of the formula (1a), 1.33 parts of the dye of the formula (2a), 1.33 parts of the dye of the formula (3a), 5 parts of sodium chloride, 10 parts of sodium carbonate and 1 part of a wetting agent is dissolved in 1000 parts of water. This dyebath is entered with 100 g of a cotton fabric. The rest of the processing is carried out as indicated in Example 1. This provides a strong brown dyeing having very good fastness properties.

EXAMPLE 3

A mixture of 2.66 parts of the dye of the formula (1a), 2.66 parts of the dye of the formula (2a), 2.66 parts of the dye of the formula (3a), 10 parts of sodium chloride, 15 parts of sodium carbonate and 1 part of a wetting agent is dissolved in 1000 parts of water. This dyebath is entered with 100 g of a cotton fabric. The rest of the processing is carried out as indicated in Example 1. This provides a strong brown dyeing having very good fastness properties.

EXAMPLE 4 TO 20

The dyeing process of Example 1 is repeated with the dye of the formula (1a) being replaced by a dye of the general formula (1) where $D_1$, $R_1$ and $R_2$ are each as defined in the table which follows. In all cases strong brown dyeings having a very good fastness level are obtained.

| Example | $D_1$ | $R_1$ | $R_2$ |
|---|---|---|---|
| 4 | 6,8-disulfo-naphth-2-yl | methyl | hydrogen |
| 5 | " | amino | chlorine |
| 6 | " | " | hydrogen |
| 7 | 4,8-disulfo-naphth-2-yl | methyl | " |
| 8 | " | amino | " |
| 9 | " | methyl | chlorine |
| 10 | " | amino | " |
| 11 | 3,6,8-trisulfo-naphth-2-yl | " | chlor |
| 12 | " | " | hydrogen |
| 13 | 2,5-disulfo-phenyl | amino | " |
| 14 | " | " | chlorine |
| 15 | " | methyl | " |
| 16 | " | " | hydrogen |

-continued

| Example | $D_1$ | $R_1$ | $R_2$ |
|---------|-------|-------|-------|
| 17 | 2,4-disulfo-phenyl | amino | " |
| 18 | " | " | chlorine |
| 19 | " | methyl | " |
| 20 | " | " | hydrogen |

EXAMPLES 21 TO 29

The dyeing process of Example 1 is repeated with the dye of the formula (2a) being replaced by a dye of the general formula (2b)

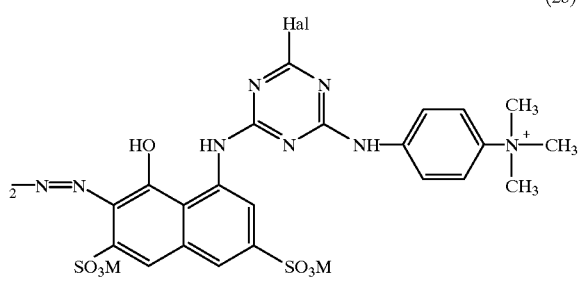

(2b)

where $D_2$ and Hal are each as defined in the table which follows. In all cases strong brown dyeings having a very good fastness level are obtained.

| Example | $D_2$ | Hal |
|---------|-------|-----|
| 21 | 3-(β-sulfatoethylsulfonyl)-phenyl- | fluorine |
| 22 | " | chlorine |
| 23 | 4-(β-sulfatoethylsulfonyl)-phenyl- | " |
| 24 | 2-methoxy-5-(β-sulfatoethylsulfonyl)-phenyl | " |
| 25 | " | fluorine |
| 26 | 2-methoxy-5-methyl-4-(β-sulfatoethylsulfonyl)-phenyl- | " |
| 27 | 2-methoxy-5-methyl-4-(β-sulfatoethylsulfonyl)-phenyl- | chlorine |
| 28 | 2,5-dimethoxy-4-(β-sulfatoethylsulfonyl)-phenyl- | " |
| 29 | " | fluorine |

EXAMPLE 30 TO 39

The dyeing process of Example 1 is repeated with the dye of the formula (2a) being replaced by a dye of the general formula (2c)

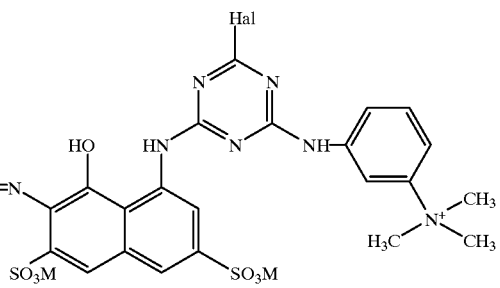

(2c)

where $D_2$ and Hal are each as defined in the table which follows. In all cases strong brown dyeings having a very good fastness level are obtained.

| Example | $D_2$ | Hal |
|---------|-------|-----|
| 30 | 3-(β-sulfatoethylsulfonyl)-phenyl- | fluorine |
| 31 | " | chlorine |
| 32 | 4-(β-sulfatoethylsulfonyl)-phenyl- | " |
| 33 | " | fluorine |
| 34 | 2-methoxy-5-(β-sulfatoethylsulfonyl)-phenyl | " |
| 35 | " | fluorine |
| 36 | 2-methoxy-5-methyl-4-(β-sulfatoethylsulfonyl)-phenyl- | " |
| 37 | 2-methoxy-5-methyl-4-(β-sulfatoethylsulfonyl)-phenyl- | chlorine |
| 38 | 2,5-dimethoxy-4-(β-sulfatoethylsulfonyl)-phenyl- | " |
| 39 | " | fluorine |

EXAMPLES 40 TO 57

The dyeing process of Example 1 is repeated with the dye of the formula (3a) being replaced by a dye of the general formula (3b)

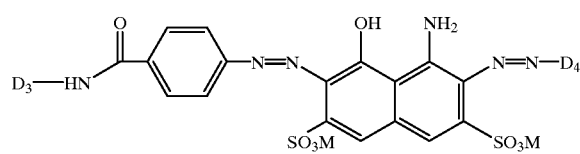

(3b)

where $D_3$ and $D_4$ are each as defined in the table which follows. In all cases strong brown dyeings having a very good fastness level are obtained.

| Example | $D_3$ | $D_4$ |
|---------|-------|-------|
| 40 | 4-(β-sulfatoethylsulfonyl)-phenyl- | 3-(β-sulfatoethylsulfonyl)-phenyl- |
| 41 | 4-(β-sulfatoethylsulfonyl)-phenyl- | 2-methoxy-5-(β-sulfatoethylsulfonyl)-phenyl |
| 42 | 4-(β-sulfatoethylsulfonyl)-phenyl- | 2-methoxy-5-methyl-4-(β-sulfatoethylsulfonyl)-phenyl- |
| 43 | 4-(β-sulfatoethylsulfonyl)-phenyl- | 2,5-dimethoxy-4-(β-sulfatoethylsulfonyl)-phenyl- |
| 44 | 3-(β-sulfatoethylsulfonyl)-phenyl- | 4-(β-sulfatoethylsulfonyl)-phenyl- |

-continued

| Example | D3 | D4 |
|---|---|---|
| 45 | 3-(β-sulfatoethylsulfonyl)-phenyl- | 3-(β-sulfatoethylsulfonyl)-phenyl- |
| 46 | 3-(β-sulfatoethylsulfonyl)-phenyl- | 2-methoxy-5-(β-sulfatoethylsulfonyl)-phenyl- |
| 47 | 3-(β-sulfatoethylsulfonyl)-phenyl- | 2-methoxy-5-methyl-4-(β-sulfatoethylsulfonyl)-phenyl- |
| 48 | 3-(β-sulfatoethylsulfonyl)-phenyl- | 2,5-dimethoxy-4-(β-sulfatoethylsulfonyl)-phenyl- |
| 49 | 2-methoxy-5-(β-sulfatoethylsulfonyl)-phenyl | 4-(β-sulfatoethylsulfonyl)-phenyl- |
| 50 | 2-methoxy-5-(β-sulfatoethylsulfonyl)-phenyl | 3-(β-sulfatoethylsulfonyl)-phenyl- |
| 51 | 2-methoxy-5-(β-sulfatoethylsulfonyl)-phenyl | 2-methoxy-5-(β-sulfatoethylsulfonyl)-phenyl- |
| 52 | 2-methoxy-5-methyl-4-(β-sulfatoethylsulfonyl)-phenyl- | 3-(β-sulfatoethylsulfonyl)-phenyl- |
| 53 | 2-methoxy-5-methyl-4-(β-sulfatoethylsulfonyl)-phenyl- | 4-(β-sulfatoethylsulfonyl)-phenyl- |
| 54 | 2-methoxy-5-methyl-4-(β-sulfatoethylsulfonyl)-phenyl- | 2-methoxy-5-(β-sulfatoethylsulfonyl)-phenyl- |
| 55 | 2,5-dimethoxy-4-(β-sulfatoethylsulfonyl)-phenyl- | 2-methoxy-5-(β-sulfatoethylsulfonyl)-phenyl- |
| 56 | 2,5-dimethoxy-4-(β-sulfatoethylsulfonyl)-phenyl- | 3-(β-sulfatoethylsulfonyl)-phenyl- |
| 57 | 2,5-dimethoxy-4-(β-sulfatoethylsulfonyl)-phenyl- | 4-(β-sulfatoethylsulfonyl)-phenyl- |
| 65 | 3-(β-sulfatoethylsulfonyl)-phenyl- | 2-methoxy-5-(β-sulfatoethylsulfonyl)-phenyl- |
| 66 | 3-(β-sulfatoethylsulfonyl)-phenyl- | 2-methoxy-5-methyl-4-(β-sulfatoethylsulfonyl)-phenyl- |
| 67 | 3-(β-sulfatoethylsulfonyl)-phenyl- | 2,5-dimethoxy-4-(β-sulfatoethylsulfonyl)-phenyl- |
| 68 | 2-methoxy-5-(β-sulfatoethylsulfonyl)-phenyl | 4-(β-sulfatoethylsulfonyl)-phenyl- |
| 69 | 2-methoxy-5-(β-sulfatoethylsulfonyl)-phenyl | 3-(β-sulfatoethylsulfonyl)-phenyl- |
| 70 | 2-methoxy-5-(β-sulfatoethylsulfonyl)-phenyl | 2-methoxy-5-(β-sulfatoethylsulfonyl)-phenyl- |
| 71 | 2-methoxy-5-methyl-4-(β-sulfatoethylsulfonyl)-phenyl- | 3-(β-sulfatoethylsulfonyl)-phenyl- |
| 72 | 2-methoxy-5-methyl-4-(β-sulfatoethylsulfonyl)-phenyl- | 4-(β-sulfatoethylsulfonyl)-phenyl- |
| 73 | 2-methoxy-5-methyl-4-(β-sulfatoethylsulfonyl)-phenyl- | 2-methoxy-5-(β-sulfatoethylsulfonyl)-phenyl- |
| 74 | 2,5-dimethoxy-4-(β-sulfatoethylsulfonyl)-phenyl- | 2-methoxy-5-(β-sulfatoethylsulfonyl)-phenyl- |
| 75 | 2,5-dimethoxy-4-(β-sulfatoethylsulfonyl)-phenyl- | 3-(β-sulfatoethylsulfonyl)-phenyl- |
| 76 | 2,5-dimethoxy-4-(β-sulfatoethylsulfonyl)-phenyl- | 4-(β-sulfatoethylsulfonyl)-phenyl- |

EXAMPLES 58 TO 76

The dyeing process of Example 1 is repeated with the dye of the formula (3a) being replaced by a dye of the general formula (3c)

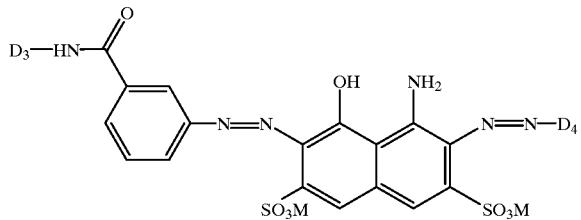

(3c)

where $D_3$ and $D_4$ are each as defined in the table which follows. In all cases strong brown dyeings having a very good fastness level are obtained.

| Example | D3 | D4 |
|---|---|---|
| 58 | 4-(β-sulfatoethylsulfonyl)-phenyl- | 4-(β-sulfatoethylsulfonyl)-phenyl- |
| 59 | 4-(β-sulfatoethylsulfonyl)-phenyl- | 3-(β-sulfatoethylsulfonyl)-phenyl- |
| 60 | 4-(β-sulfatoethylsulfonyl)-phenyl- | 2-methoxy-5-(β-sulfatoethylsulfonyl)-phenyl |
| 61 | 4-(β-sulfatoethylsulfonyl)-phenyl- | 2-methoxy-5-methyl-4-(β-sulfatoethylsulfonyl)-phenyl- |
| 62 | 4-(β-sulfatoethylsulfonyl)-phenyl- | 2,5-dimethoxy-4-(β-sulfatoethylsulfonyl)-phenyl- |
| 63 | 3-(β-sulfatoethylsulfonyl)-phenyl- | 4-(β-sulfatoethylsulfonyl)-phenyl- |
| 64 | 3-(β-sulfatoethylsulfonyl)-phenyl- | 3-(β-sulfatoethylsulfonyl)-phenyl- |

EXAMPLE 77

A mixture of 2 parts of the dye of the formula (1a), 1 part of the dye of the formula (2a), 8 parts of the dye of the formula (3a), 10 parts of sodium chloride, 15 parts of sodium carbonate and 1 part of a wetting agent is dissolved in 1000 parts of water. This dyebath is entered with 100 g of a cotton fabric. The rest of the processing is carried out as indicated in Example 1. This provides a strong black dyeing having very good fastness properties.

EXAMPLE 78

A mixture of 2.2 parts of the dye of the formula (1a), 1.5 parts of the dye of the formula (2a), 10 parts of the dye of the formula (3a), 10 parts of sodium chloride, 15 parts of sodium carbonate and 1 part of a wetting agent is dissolved in 1000 parts of water. This dyebath is entered with 100 g of a cotton fabric. The rest of the processing is carried out as indicated in Example 1. This provides a strong black dyeing having very good fastness properties.

EXAMPLE 79

A mixture of 3.0 parts of the dye of the formula (1a), 2.0 parts of the dye of the formula (2a), 10 parts of the dye of the formula (3a), 10 parts of sodium chloride, 15 parts of sodium carbonate and 1 part of a wetting agent is dissolved in 1000 parts of water. This dyebath is entered with 100 g of a cotton fabric. The rest of the processing is carried out as indicated in Example 1. This provides a strong black dyeing having very good fastness properties.

EXAMPLE 80

A mixture of 2.4 parts of the dye of the formula (1a), 0.4 part of the dye of the formula (2a), 5.2 parts of the dye of the formula (3a), 10 parts of sodium chloride, 15 parts of sodium carbonate and 1 part of a wetting agent is dissolved in 1000 parts of water. This dyebath is entered with 100 g of a cotton fabric. The rest of the processing is carried out as indicated in Example 1. This provides a strong green dyeing having very good fastness properties.

EXAMPLE 81

A mixture of the following components:

1 part of the dye of the formula (1a),
1 part of the dye of the formula (2a),
8 parts of sodium carbonate and
1 part of a commercially available wetting agent is dissolved in 1000 parts of water. This dyebath is entered with 100 g of a cotton fabric. The rest of the processing is carried out as indicated in Example 1. This provides a strong orange dyeing having very good fastness properties.

EXAMPLE 82

A mixture of the following components:

1 part of the dye of the formula (1a),
1 part of the dye of the formula (3a),
8 parts of sodium carbonate and
1 part of a commercially available wetting agent is dissolved in 1000 parts of water. This dyebath is entered with 100 g of a cotton fabric. The rest of the processing is carried out as indicated in Example 1. This provides a strong green dyeing having very good fastness properties

EXAMPLE 83

A mixture of the following components:

1 part of the dye of the formula (2a),
1 part of the dye of the formula (3a),
8 parts of sodium carbonate and
1 part of a commercially available wetting agent is dissolved in 1000 parts of water. This dyebath is entered with 100 g of a cotton fabric. The rest of the processing is carried out as indicated in Example 1. This provides a strong violet dyeing having very good fastness properties.

EXAMPLE 84

A mixture of the following components:

1 part of the dye of the formula (1a),
1 part of the dye of the formula (2a),
5 parts of sodium chloride,
10 parts of sodium carbonate and
1 part of a commercially available wetting agent is dissolved in 1000 parts of water. This dyebath is entered with 100 g of a cotton fabric. The rest of the processing is carried out as indicated in Example 1. This provides a strong orange dyeing having very good fastness properties.

What is claimed is:

1. A mixture of reactive dyes which comprises at least two dyes selected from the group consisting of the general formulae (1), (2) and (3)

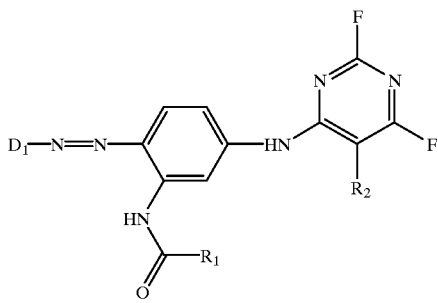

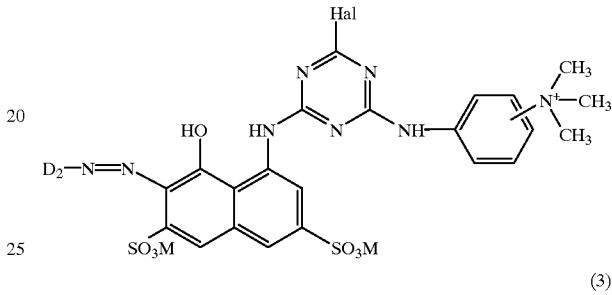

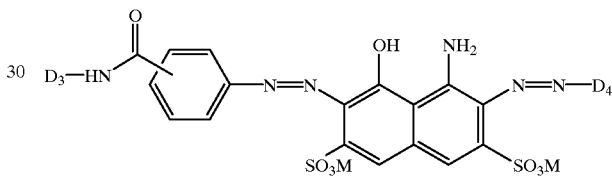

where
$D_1$ is a benzene or naphthalene ring containing one or more sulfonic acid groups;
$R_1$ is methyl or amino;
$R_2$ is hydrogen or chlorine;
Hal is fluorine or chlorine;
M is hydrogen or an alkali metal;
$D_2$ to $D_4$ are each a group of the general formula (D)

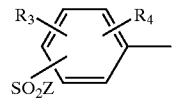

where
$R_3$ and $R_4$ are independently hydrogen, methyl, ethyl, methoxy, ethoxy, sulfo or carboxyl, and
Z is —CH=CH$_2$ or —CH$_2$CH$_2$Z$_1$, where $Z_1$ is an alkali-detachable group.

2. A mixture as claimed in claim 1, comprising one or more each of the dyes of the general formulae (1) and (2), (1) and (3) or (2) and (3), the dye or dyes of the general formulae mentioned each being present in amounts of 10 to 90% by weight based on the total amount of dye.

3. A mixture as claimed in claim 1, comprising one or more of each of the dyes of the general formulae (1), (2) and (3), the dyes of the general formula (1) being present in amounts of 5 to 90% by weight, dyes of the general formula (2) in amounts of 5 to 80% by weight and dyes of the general formula (3) in amounts of 5 to 90% by weight, in each case based on the total amount of dye.

4. A mixture as claimed in claim 1, comprising one or more of each of the dyes of the general formulae (1), (2) and (3), the dyes of the general formula (1) being present in amounts of 5 to 50% by weight, dyes of the general formula (2) in amounts of 5 to 50% by weight and dyes of the general formula (3) in amounts of 45 to 90% by weight, in each case based on the total amount of dye.

5. A mixture as claimed in claim 1, comprising one or more of each of the dyes of the general formulae (1), (2) and (3), the dyes of the general formula (1) being present in amounts of 30 to 80% by weight, dyes of the general formula (2) in amounts of 5 to 50% by weight and dyes of the general formula (3) in amounts of 10 to 50% by weight, in each case based on the total amount of dye.

6. A mixture as claimed in claim 1, wherein a benzene or napthalene ring $D_1$ contains 2 sulfonic acid groups.

7. A mixture as claimed in claim 1, wherein $R_3$ and $R_4$ are each hydrogen and Z is vinyl or β-sulfatoethyl.

8. A process for preparing the mixture of reactive dyes of claim 1, which comprises mechanically mixing the individual dyes.

9. A process for dyeing or printing hydroxyl-and/or carboxamido-containing material, which comprises contacting the mixture of reactive dyes as claimed in claim 1 with the material.

10. The process of claim 9, wherein up to 2% by weight of the mixture of reactive dyes, based on the material to be dyed or printed, is used without electrolyte salt, 2 to 4% by weight is used with 1 to 5 g of electrolyte salt/l of dyebath and 4 to 10% by weight is used with 5 to 10 g of electrolyte salt/l of dyebath.

11. The mixture as claimed in claim 1, comprising one or more of each of the dyes of the general formulae (1) and (2), (1) and (3) or (2) and (3), the dye or dyes of the general formulae mentioned each being present in amounts of 30 to 70% by weight based on the total amount of the dye.

12. The mixture as claimed in claim 2, wherein the dye of formula (1) is present and $R_1$ is methyl.

13. The mixture as claimed in claim 2, wherein the dye of formula (1) is present and $R_1$ is amino.

14. The mixture as claimed in claim 12, wherein $R_2$ is hydrogen.

15. The mixture as claimed in claim 12, wherein $R_2$ is chlorine.

16. The mixture as claimed in claim 13, wherein $R_2$ is hydrogen.

17. The mixture as claimed in claim 13, wherein $R_2$ is chlorine.

18. The mixture as claimed in claim 2, wherein the dye of formula 2 is present and Hal is fluorine.

19. The mixture as claimed in claim 2, wherein the dye of formula 2 is present and Hal is chlorine.

20. The mixture as claimed in claim 2, wherein the dye of formula 3 is present and M is an alkali metal.

* * * * *